Oct. 14, 1941.  J. S. MORGAN, JR  2,258,785

DRAWWORKS

Original Filed Dec. 21, 1935

Inventor
John S. Morgan Jr.
By Lyon & Lyon
Attorneys

Patented Oct. 14, 1941

2,258,785

UNITED STATES PATENT OFFICE 2,258,785

DRAWWORKS

John S. Morgan, Jr., Manhattan Beach, Calif., assignor to The National Supply Company, Pittsburgh, Pa., a corporation of Pennsylvania Original application December 21, 1935, Serial No. 55,591. Divided and this application April 29, 1939, Serial No. 270,797

3 Claims. (Cl. 254—187)

This invention relates to drilling equipment as utilized in drilling for water, oil, gas, or other drilling operations, and more particularly to the type of rotary drawworks employed in connection with the rotary method of drilling wells.

This application is a division of my copending application, filed December 21, 1935, for Drawworks, now Patent No. 2,161,075.

The particular object of this invention is to provide a rotary drilling apparatus wherein means are provided in the drawworks construction constituting a feed control utilizing a variable speed transmission to enable the accurate governing of the rate of feed of the drill pipe into the drilled hole during drilling operations.

Another object of this invention is to provide a drive mechanism for a well drilling apparatus wherein variable means are provided for governing the rate of feed of the drill pipe within the drilled hole, which means include an hydraulic transmission.

Another object of this invention is to provide a rotary drilling apparatus which includes a drawworks and a rotary machine wherein there is provided a means for driving the rotary machine from the drawworks and in which apparatus there is provided a means including a variable displacement fluid pump operatively connected with a fluid motor to control the speed of lowering of the drill pipe into the well embodying a means to selectively vary the displacement of the fluid pump under control of the driller whereby an accurate and sensitive control of the rate of lowering the drill pipe into the hole may be had.

Other objects and advantages of this invention it is believed will be apparent from the hereinafter contained description of the preferred embodiments of my invention.

Figures 1, 2:
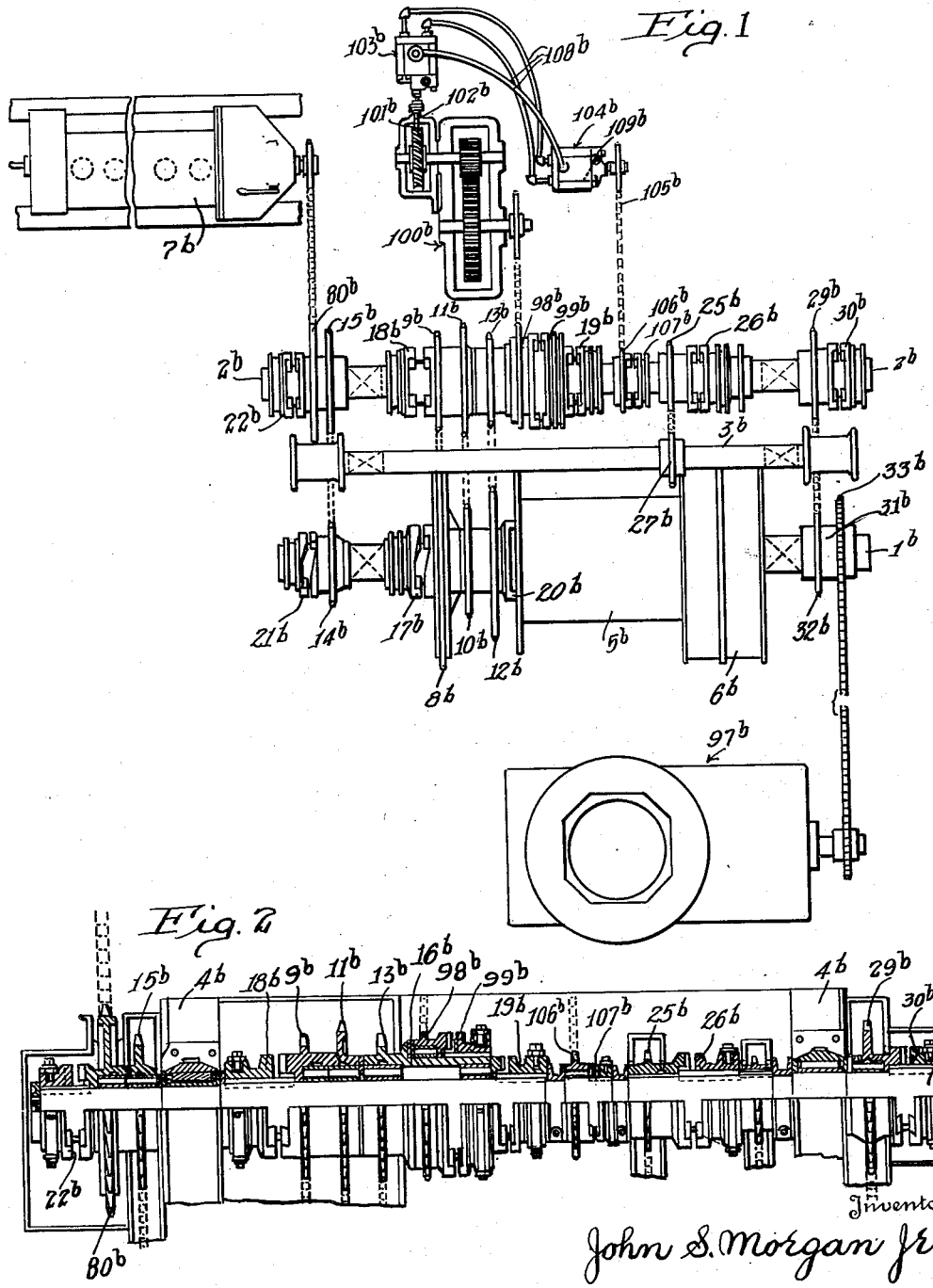
Figure 1 is a diagrammatic view showing the drawworks embodying my invention illustrated in connection with an improved drilling control.
Figure 2 is a partly sectioned view of the rotary drawworks drive shaft as illustrated in Figure 1.

In the preferred embodiment of my invention as illustrated in the accompanying drawing, the drumshaft 1b, driveshaft 2b, and catshaft 3b are rotatably mounted in spaced supports 4b. A spooling drum 5b provided with brake rims 6b is secured upon the drumshaft 1b intermediate the supports 4b. Means are provided for driving the drumshaft 1b from the driveshaft 2b, and this means includes sprockets 15b, 9b, 11b and 13b rotatably mounted on the driveshaft 2b and aligned respectively and connected by chain with sprockets 14b, 8b, 10b and 12b rotatably mounted on the drumshaft 1b. A prime mover 7b is adapted to rotate drive sprocket 80b which is formed integrally with sprocket 15b. A clutch 22b is adapted to releasably connect sprocket 80b and 15b to the drive shaft 2b. Similarly, clutch 18b is adapted to releasably connect sprockets 9b and 11b, which are formed as an integral member, to the drive shaft 2b, and clutch 19b is adapted to connect sprocket 13b and its integral sleeve 16b to the driveshaft 2b. In like manner, clutch 21b is adapted to releasably connect sprocket 14b to the drumshaft 1b, clutch 20b is adapted to releasably connect sprocket 12b to the drumshaft 1b, and clutch 17b is adapted to connect sprockets 8b and 10b, which are formed as an integral member, to the drumshaft 1b.

Selective operation of the various clutches provides five speeds for the drumshaft 1b as follows: (1) Through sprockets 15b and 14b, (2) through sprockets 9b and 8b, (3) through sprockets 11b and 10b, (4) through sprockets 13b and 12b, and (5) by means of the compound drive through sprockets 13b to 12b, then back through sprockets 10b to 11b, and finally forward through sprockets 9b to 8b.

Selective means are provided for driving the catshaft 3b from the drive shaft 2b including sprocket 27b fixed on the catshaft 3b aligned and connected by chain with sprocket 25b rotatably mounted on the drive shaft 2b. A clutch 26b is adapted to releasably connect the sprocket 25b to the drive shaft 2b.

A rotary drive sprocket 29b is rotatably mounted on the drive shaft 2b and is adapted to be releasably connected thereto by means of clutch 30b. The sprocket 29b is connected to drive the sprocket 23b of the rotary machine 97b through the intermediate double sprocket member 31b, the sprockets 29b and 32b, and the sprockets 33b and 23b being respectively connected by chain.

With this construction there is incorporated in the drawworks a feeding control which employs a variable speed hydraulic transmission for accurately governing the rate of feed of the drill pipe in the hole during the drilling operations. The feed control includes one or more speed reduction units 100b which are driven by suitable transmission connections from sprocket 98b, which is rotatably mounted on the sleeve 16b and releasably clutched thereto by means of clutch 99b.

The speed reduction unit 100b is connected to a worm gear reduction unit 101b. The worm gear reduction unit 101b is connected through its common shaft 102b with the motor end 103b of the Waterbury gear drive. A fluid pump 104b of the Waterbury gear drive is connected by transmission connection 105b with the sprocket 106b journaled on the shaft 2b.

A clutch 107b is provided for releasably clutching the sprocket 106b to the shaft 2b. The motor unit 103b of the Waterbury gear is connected through suitable conduits 108b with the pump unit 104b.

As is customarily provided in such hydraulic gear drives of the Waterbury pump type, a control screw 109b is provided upon the pump end to vary the rate of discharge of oil to the motor end. The motor end is essentially a constant stroke motor and its speed is accurately governed by the rate of flow of oil delivered to it. Therefore, the setting of the control screw 109b governs the speed of the shaft 102b assuming that the shaft 2b rotates at a constant speed.

Shaft 102b drives through the worm gear reduction unit 101b and spur gear reduction unit 100b to the sprocket 98b. This sprocket 98b is connected to sprocket 13b by means of clutch 99b. From the sprocket 13b on the drive-shaft 2b the drive may go directly to the drumshaft 1b through sprocket 12b and clutch 20b, or indirectly to the drumshaft 1b through sprockets 13b and 12b, back through sprockets 10b and 11b, then from sprocket 9b to sprocket 8b and then to the drumshaft 1b through clutch 17b. It should be observed that sprockets 9b and 11b, and sprockets 10b and 12b are each formed integral.

With clutches 107b, 99b, and 17b engaged, rotation of the drive shaft 2b results in very slow rotation of the drum 5b. This rate of drum rotation may be increased or decreased in either forward or reverse simply by manipulating the control screw 109b. In this way the drill pipe may be slowly raised or lowered or held at the same elevation, and its movement is under very accurate control. Furthermore, for any given setting of the control screw 109b, the rate of feed of the drill pipe is proportional to its speed of rotation, since the rotary machine 97b and the pump end 104b of the hydraulic gear are both driven from the drive shaft 2b.

During this operation it is possible to use the reduction available in the drawworks itself because the sprockets 9b, 11b and 13b and the clutch 99b float on the drive shaft 2b and are not affected by its rotation which is necessary to drive the rotary machine 97b. It will be obvious that the drilling control thus provided can be easily disconnected at will from the drilling apparatus simply by disengaging the clutches 107b and 99b and when thus disconnected the drawworks can be operated in the conventional manner.

The feed control thus described may be utilized as a transmission connection through which the drum of the drawworks may be rotated in a direction to raise or lower the tool suspended from the line wound upon the drum, or may be utilized to hold the same in position.

In this form of construction when desired the full power of the transmission drive to the drawworks or the rotary machine may be had without driving through the feed control.

Having fully described my invention, it is to be understood that I do not wish to be limited to the details herein set forth, but my invention is of the full scope of the appended claims.

I claim:

1. In a rotary drilling rig, the combination of a drawworks having a drumshaft and a driveshaft, a spooling drum on the drumshaft, a sleeve member rotatably mounted on the drive shaft, a fluid motor, means including a variable displacement fluid pump driven by the drive shaft to actuate said fluid motor, transmission connections between the sleeve member and the spooling drum and between the fluid motor and the sleeve member whereby the fluid motor may control the speed of rotation of the spooling drum, and means to selectively vary the displacement of the fluid pump to effect variations in the speed of said fluid motor.

2. In a rotary drilling rig, the combination of a drawworks having a drumshaft and a driveshaft, a spooling drum on the drum shaft, speed reduction means whereby the drive shaft may drive said drum, said speed reduction means including a sleeve element rotatably mounted on said drive shaft and a releasable clutch adapted to couple the sleeve and drive shaft in direct driving relation, variable speed power transmission apparatus releasably connected to drive the sleeve element of said speed reduction means upon said releasable clutch means being rendered inoperative, and manual control means for said variable speed power transmission apparatus whereby the speed of rotation of the sleeve element may be accurately regulated.

3. In a rotary drilling rig, the combination of a drawworks having a drumshaft and a driveshaft, a spooling drum on the drum shaft, means whereby the driveshaft may drive the spooling drum, said means including a power transmission member rotatably mounted with respect to the driveshaft and operatively connected to drive the drum through speed reduction transmission connections, a worm gear speed reduction unit having a worm and a worm wheel, speed reduction means operatively connecting said worm wheel to said power transmission member, the worm acting to prevent rotation of the worm wheel under influence of an applied load on said spooling drum, an infinitely variable speed transmission driven from the driveshaft and operatively connected to drive said worm, and manual control means for said transmission adapted to cause rotation of the spooling drum at any desired feeding rate in either forward or reverse direction.

JOHN S. MORGAN, Jr.